United States Patent
Truong et al.

(10) Patent No.: US 11,416,531 B2
(45) Date of Patent: *Aug. 16, 2022

(54) SYSTEMS AND METHODS FOR PARSING LOG FILES USING CLASSIFICATION AND A PLURALITY OF NEURAL NETWORKS

(71) Applicant: Capital One Services, LLC, McLean, VA (US)

(72) Inventors: Anh Truong, Champaign, IL (US); Fardin Abdi Taghi Abad, Champaign, IL (US); Austin Walters, Savoy, IL (US); Jeremy Goodsitt, Champaign, IL (US); Vincent Pham, Champaign, IL (US); Kate Key, Effingham, IL (US)

(73) Assignee: Capital One Services, LLC, McLean, VA (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/659,729

(22) Filed: Oct. 22, 2019

(65) Prior Publication Data
US 2020/0125595 A1 Apr. 23, 2020

Related U.S. Application Data

(63) Continuation of application No. 16/163,483, filed on Oct. 17, 2018, now Pat. No. 10,452,700.

(51) Int. Cl.
| | | |
|---|---|---|
| *G06F 16/35* | (2019.01) | |
| *G06N 3/04* | (2006.01) | |
| *G06N 3/08* | (2006.01) | |
| *G06F 16/25* | (2019.01) | |
| *G06F 40/205* | (2020.01) | |

(52) U.S. Cl.
CPC ............ *G06F 16/35* (2019.01); *G06F 16/258* (2019.01); *G06F 40/205* (2020.01); *G06N 3/04* (2013.01); *G06N 3/0445* (2013.01); *G06N 3/08* (2013.01)

(58) Field of Classification Search
CPC .. G06F 16/353; G06F 16/951; G06F 16/9535; G06F 17/2785; G06F 16/2228; G06F 16/284; G06F 17/2705; G06F 16/00; G06F 16/313; G06F 16/288
See application file for complete search history.

(56) References Cited

U.S. PATENT DOCUMENTS

| | | | |
|---|---|---|---|
| 6,996,575 B2 * | 2/2006 | Cox | G06F 16/35 707/999.102 |
| 2010/0241698 A1 | 9/2010 | Hillerbrand | |
| 2014/0372346 A1 * | 12/2014 | Phillipps | G06N 20/00 706/12 |

(Continued)

*Primary Examiner* — Angelica Ruiz
(74) *Attorney, Agent, or Firm* — Finnegan, Henderson, Farabow, Garrett & Dunner, LLP

(57) ABSTRACT

The present disclosure relates to systems and methods for parsing unstructured data with neural networks. In one implementation, a system for parsing unstructured data may include at least one processor and at least one non-transitory memory storing instructions that, when executed by the at least one processor, cause the system to: receive unstructured data; apply a classifier to the unstructured data to identify a type of the unstructured data; based on the identification, select a corresponding neural network; apply the selected neural network to the unstructured data to obtain structured data; and output the structured data.

20 Claims, 11 Drawing Sheets

(56) References Cited

U.S. PATENT DOCUMENTS

2015/0324434 A1   11/2015  Greenwood
2016/0313463 A1   10/2016  Wahrmund
2017/0371958 A1*  12/2017  Ganjam ................ G06F 40/216

* cited by examiner

```
2018-08-31 13:08:03, Info   CBS    Lock: New lock added: CCbsSessionManager, level: 11, total lock:8
2018-08-31 13:08:03, Info   CBS    Lock: New lock added: CSIInventoryCriticalSection, level: 64, total
lock:9
2018-08-31 13:08:03, Info   CBS    NonStart: Set pending store consistency check.
2018-08-31 13:08:03, Info   CBS    Session: 30687565_770264849 initialized by client
WindowsUpdateAgent, external staging directory: (null), external registry directory: (null
2018-08-31 13:08:03, Info   CBS    Failed to internally open package. [HRESULT = 0x800f0805 -
CBS_E_INVALID_PACKAGE]
2018-08-31 13:08:03, Info   CBS    Failed to create open package. [HRESULT = 0x800f0805 -
CBS_E_INVALID_PACKAGE]
2018-08-31 13:08:03, Info   CBS    Failed to OpenPackage using worker session [HRESULT =
0x800f0805]
2018-08-31 13:08:03, Info   CBS    Session: 30687565_770284885 initialized by client
WindowsUpdateAgent, external staging directory: (null), external registry directory: (null
2018-08-31 13:08:03, Info   CBS    Failed to internally open package. [HRESULT = 0x800f0805 -
CBS_E_INVALID_PACKAGE]
2018-08-31 13:08:03, Info   CBS    Failed to create open package. [HRESULT = 0x800f0805 -
CBS_E_INVALID_PACKAGE]
2018-08-31 13:08:03, Info   CBS    Failed to OpenPackage using worker session [HRESULT =
0x800f0805]
```

220

```
2018-08-31 13:08:03 Info CBS Lock New lock added CCbsSessionManager level 11 total lock8
2018-08-31 13:08:03 Info CBS Lock New lock added CSIInventoryCriticalSection level 64 total lock9
2018-08-31 13:08:03 Info CBS NonStart Set pending store consistency check
2018-08-31 13:08:03 Info CBS Session 30687565_770264849 initialized by client
WindowsUpdateAgent external staging directory (null) external registry directory (null
2018-08-31 13:08:03 Info CBS Failed to internally open package [HRESULT = 0x800f0805 -
CBS_E_INVALID_PACKAGE]
2018-08-31 13:08:03 Info CBS Failed to create open package [HRESULT = 0x800f0805 -
CBS_E_INVALID_PACKAGE]
2018-08-31 13:08:03 Info CBS Failed to OpenPackage using worker session [HRESULT = 0x800f0805]
2018-08-31 13:08:03 Info CBS Session 30687565_770284885 initialized by client
WindowsUpdateAgent external staging directory (null) external registry directory (null
2018-08-31 13:08:03 Info CBS Failed to internally open package [HRESULT = 0x800f0805 -
CBS_E_INVALID_PACKAGE]
2018-08-31 13:08:03 Info CBS Failed to create open package [HRESULT = 0x800f0805 -
CBS_E_INVALID_PACKAGE]
2018-08-31 13:08:03 Info CBS Failed to OpenPackage using worker session [HRESULT = 0x800f0805]
```

| Date | Time | Action | Result |
|---|---|---|---|
| 2018-08-31 | 13:08:03 | Lock | New lock CCbsSessionManager |
| 2018-08-31 | 13:08:03 | Lock | New lock CSIInventoryCriticalSection |
| 2018-08-31 | 13:08:03 | New Session | Initialize session 30687565_770264849 |
| 2018-08-31 | 13:08:03 | Fail | Fail to open invalid package |
| 2018-08-31 | 13:08:03 | Fail | Fail to create invalid package |
| 2018-08-31 | 13:08:03 | Fail | Fail to open package using worker session |
| 2018-08-31 | 13:08:03 | New Session | Initialize session 30687565_770284885 |
| 2018-08-31 | 13:08:03 | Fail | Fail to open invalid package |
| 2018-08-31 | 13:08:03 | Fail | Fail to create invalid package |
| 2018-08-31 | 13:08:03 | Fail | Fail to open package using worker session |

240

SYSTEMS AND METHODS FOR PARSING LOG FILES USING CLASSIFICATION AND A PLURALITY OF NEURAL NETWORKS

CROSS-REFERENCE TO RELATED APPLICATIONS

This application is a continuation of U.S. application Ser. No. 16/163,483, filed Oct. 17, 2018, the contents of which are incorporated herein by reference.

TECHNICAL FIELD

The disclosed embodiments concern a platform for management of artificial intelligence systems. In particular, the disclosed embodiments concern using the disclosed platform to create models of data. These data models can be used to generate synthetic data for testing or training artificial intelligence systems. The disclosed embodiments also concern improvements to generative adversarial network models and adversarially learned inference models.

The disclosed embodiments further concern a platform for parsing log files from a plurality of systems. In particular, the disclosed embodiments concern using neural networks to parse unstructured data in the logs to structured data. Each neural network may be trained for a specific type of log file to increase accuracy. For types of log files with insufficient training data sets, synthetic data generation as disclosed herein may be used to improve training.

BACKGROUND

Training artificial intelligence systems can require substantial amounts of training data. Furthermore, when used with data dissimilar from the training data, artificial intelligence systems may perform poorly. These characteristics can create problems for developers of artificial intelligence applications designed to operate on sensitive data, such as customer financial records or patient healthcare data. Regulations governing the storage, transmission, and distribution of such data can inhibit application development, by forcing the development environment to comply with these burdensome regulations.

Furthermore, synthetic data can be generally useful for testing applications and systems. Such application and systems may implement one or more models. However, such models perform better when they are based on data similar to the data used to train them. But sensitive data cannot be widely distributed for use in training models, forcing application developers to choose between accuracy and training data security. Existing methods of creating synthetic data can be extremely slow and error-prone. For example, attempts to automatically desensitize data using regular expressions or similar methods requires substantial expertise and can fail when sensitive data is present in unanticipated formats or locations. Manual attempts to desensitize data can fall victim to human error. Neither approach will create synthetic data having statistical characteristics similar to those of the original data, limiting the utility of such data for training and testing purposes.

Moreover, it is known that neural networks are more accurate in processing specific tasks as compared with general tasks. However, training neural networks for specific tasks, such as for parsing specific log files, requires large data sets for each specific task. This is not always practical.

Moreover, training of neural networks for parsing specific log files then requires selection of appropriately trained parsers for incoming log files. Furthermore, new types of log files must be recognized in order to trigger training of a new specific neural network.

Accordingly, a need exists for systems and methods of creating synthetic data similar to existing datasets. Additionally, a need exists for systems and methods of training parsers specific to particular data sets and for appropriate selection and training of the specific parsers.

SUMMARY

The disclosed embodiments can improve generation of machine learning models. Security of sensitive data can be improved by tokenizing sensitive data. For example, such tokenization can result in tokenized data, sensitive data values, and a mapping between the tokens and the values, making reconstruction of the sensitive data by an attacker much more difficult. Processes for manually tokenizing data can be slow and error prone, however, the disclosed embodiments describe specific improved ways to generate synthetic data similar to sensitive data and to generate data models for tokenizing sensitive data. In this manner, the disclosed embodiments improve upon existing methods by enabling automatic generation of synthetic data and automatic tokenization of sensitive portions of datasets.

Furthermore, the use of particularized neural networks may increase accuracy but only if the correct neural network is used. Accordingly, embodiments of the present disclosure provide for a classifier to automatically direct logs and other unstructured data to corresponding neural networks, thus replacing manual processes that are slower and rely on subjective judgments. In addition, embodiments of the present disclosure may use synthetic data generation to allow for training of particularized neural networks even when initial training sets are insufficient for accuracy training alone.

In one embodiment, a system for parsing unstructured data may comprise at least one processor and at least one non-transitory memory storing instructions that, when executed by the at least one processor, cause the system to perform operations. The operations may comprise receiving unstructured data; applying a classifier to the unstructured data to identify a type of the unstructured data; based on the identification, selecting a corresponding neural network; applying the selected neural network to the unstructured data to obtain structured data; and outputting the structured data.

In one embodiment, a system for parsing unstructured data may comprise at least one processor and at least one non-transitory memory storing instructions that, when executed by the at least one processor, cause the system to perform operations. The operations may comprise receiving a log file comprising unstructured data; applying a classifier to the unstructured data to identify a distribution of one or more letters, a distribution of one or more integers, a distribution of one or more special characters, or a distribution of one or more alphanumeric characters; based on the distribution, selecting a corresponding neural network; applying the selected neural network to the log file to obtain structured data corresponding to the unstructured data of the log file; and outputting the structured data.

In one embodiment, a system for parsing unstructured data may comprise at least one processor and at least one non-transitory memory storing instructions that, when executed by the at least one processor, cause the system to perform operations. The operations may comprise receiving a log file comprising unstructured data; pre-processing the log file to standardize delimiters within the unstructured data; applying a classifier to the unstructured data to identify an application having generated the log file; based on the identification, selecting a corresponding neural network trained to parse log files from the application; applying the selected neural network to the log file to obtain tabular data corresponding to the unstructured data of the log file; and outputting the tabular data to a relational database.

In one embodiment, a system for further training a neural network for parsing unstructured data may comprise at least one processor and at least one non-transitory memory storing instructions that, when executed by the at least one processor, cause the system to perform operations. The operations may comprise receiving unstructured data; applying a classifier to the unstructured data to identify a type of the unstructured data; based on the identification, selecting a corresponding neural network; based on the received unstructured data, generating one or more sets of synthetic unstructured data; further training the selected neural network using the received unstructured data and the one or more sets of synthetic unstructured data; and outputting the further trained neural network.

In one embodiment, a system for further training a neural network for parsing unstructured data may comprise at least one processor and at least one non-transitory memory storing instructions that, when executed by the at least one processor, cause the system to perform operations. The operations may comprise receiving a log file comprising unstructured data; applying a classifier to the unstructured data to identify a distribution of one or more letters, a distribution of one or more integers, a distribution of one or more special characters, or a distribution of one or more alphanumeric characters; based on the distribution, selecting a corresponding neural network; using the determined distribution and the received log file, generating one or more synthetic log files; further training the selected neural network using the received log file and the one or more synthetic log files; and outputting the further trained neural network.

In one embodiment, a system for further training a neural network for parsing unstructured data may comprise at least one processor and at least one non-transitory memory storing instructions that, when executed by the at least one processor, cause the system to perform operations. The operations may comprise receiving a log file comprising unstructured data; pre-processing the log file to standardize delimiters within the unstructured data; applying a classifier to the unstructured data to identify an application having generated the log file; based on the identification, selecting a corresponding neural network trained to parse log files from the application; using the pre-processed log file, generating one or more synthetic log files with the standardized delimiters; further training the selected neural network using the received log file and the one or more synthetic log files; and outputting the further trained neural network.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 2B depicts an example flow of an unstructured log file through pre-processing and output of structured data from a neural network accepting the pre-processed log file, consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the methods and examples are illustrative only and are not intended to be necessarily limiting.

The disclosed embodiments can be used to automatically extract data from a large document set and to generate synthetic data and/or synthetic documents. Using these models, the disclosed embodiments can produce fully synthetic datasets with similar structure and statistics as the original sensitive datasets. In some aspects, a generated dataset can include one or more JSON (JavaScript Object Notation) or delimited files (e.g., comma-separated value, or CSV, files). In various embodiments, the disclosed systems can automatically detect sensitive portions of structured and unstructured datasets and automatically replace them with similar but synthetic values.

The disclosed embodiments can additionally or alternatively be used to automatically parse unstructured data into structured data using selection of a particularized neural network from a plurality of neural networks. Using classifiers disclosed herein, embodiments of the present disclosure may automate selection of the appropriate neural network for parsing. In addition, embodiments of the present disclosure may automate training of new particularized neural networks using one or more transfer learning techniques. Training of new neural networks may, if annotated training sets are insufficiently large, use synthetic data generation as described herein to further supplement the annotated training set.

Figure 1:
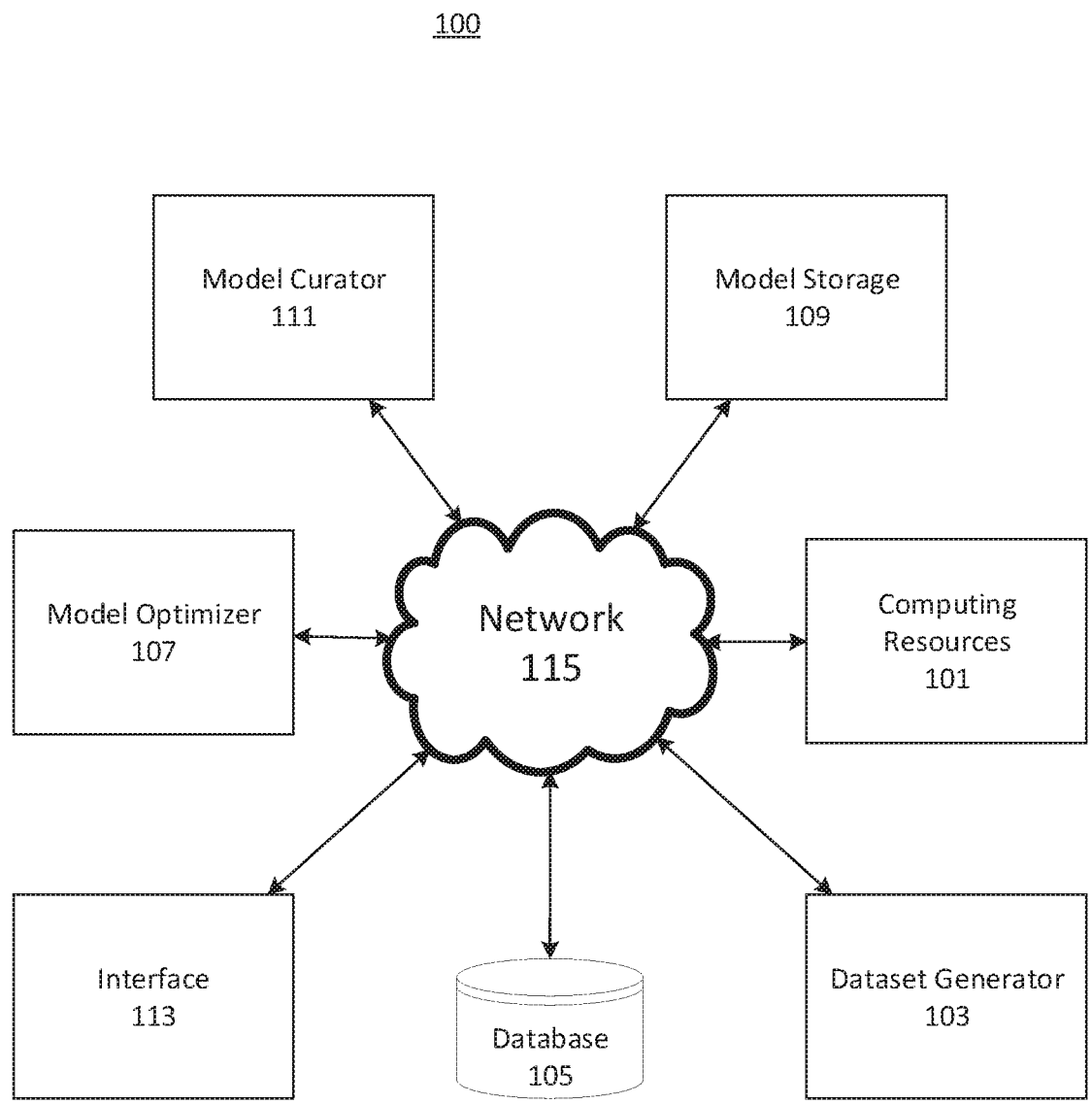
FIG. 1 depicts an exemplary cloud-computing environment for generating data models, consistent with disclosed embodiments.

FIG. 1 depicts a cloud-computing environment 100 for generating and applying data models. Environment 100 can be configured to support generation and storage of synthetic data, generation and storage of data models, optimized choice of parameters for machine learning, and imposition of rules on synthetic data and data models. Environment 100 can be configured to expose an interface for communication with other systems. Environment 100 can include computing resources 101, dataset generator 103, database 105, model optimizer 107, model storage 109, model curator 111, and interface 113. These components of environment 100 can be configured to communicate with each other, or with external components of environment 100, using network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to train data models. The computing devices can be special-purpose computing devices, such as graphical processing units (GPUs) or application-specific integrated circuits. The cloud computing resources can be general-purpose computing devices. The computing devices can be configured to host an environment for training data models. For example, the computing devices can host virtual machines, pods, or containers. The computing devices can be configured to run applications for generating data models. For example, the computing devices can be configured to run Amazon Web Services (AWS) SageMaker, Tensorflow, or similar machine learning training applications. Computing resources 101 can be configured to receive models for training from model optimizer 107, model storage 109, or another component of system 100. Computing resources 101 can be configured provide training results, including trained models and model information, such as the type and/or purpose of the model and any measures of classification error.

Dataset generator 103 can include one or more computing devices configured to generate data. Dataset generator 103 can be configured to provide data to computing resources 101, database 105, to another component of system 100 (e.g., interface 113), or another system (e.g., an APACHE KAFKA cluster or other publication service). Dataset generator 103 can be configured to receive data from database 105 or another component of system 100. Dataset generator 103 can be configured to receive data models from model storage 109 or another component of system 100. Dataset generator 103 can be configured to generate synthetic data. For example, dataset generator 103 can be configured to generate synthetic data by identifying and replacing sensitive information in data received from database 103 or interface 113. As an additional example, dataset generator 103 can be configured to generate synthetic data using a data model without reliance on input data. For example, the data model can be configured to generate data matching statistical and content characteristics of a training dataset. In some aspects, the data model can be configured to map from a random or pseudorandom vector to elements in the training data space. One or more techniques disclosed in U.S. application Ser. No. 16/151,385, filed Oct. 5, 2018, and U.S. application Ser. No. 16/151,407, filed Oct. 5, 2018, which are incorporated herein by reference, may be used to generate synthetic data for the log parsers disclosed herein.

Database 105 can include one or more databases configured to store data for use by system 100. For example, database 105 may store training data for synthetic data generation and/or for neural network training. The databases can include cloud-based databases (e.g., AMAZON WEB SERVICES S3 buckets) or on-premises databases.

Model optimizer 107 can include one or more computing systems configured to manage training of data models for system 100. Model optimizer 107 can be configured to generate models for export to computing resources 101. Model optimizer 107 can be configured to generate models based on instructions received from a user or another system. These instructions can be received through interface 113. For example, model optimizer 107 can be configured to receive a graphical depiction of a machine learning model and parse that graphical depiction into instructions for creating and training a corresponding neural network on computing resources 101. Additionally or alternatively, model optimizer 107 can be configured to generate a neural network template by retrieving a neural network from model storage 109 and resetting at least one weight and at least one activation function of the neural network while retaining the structure. In some embodiments, model optimizer 107 can be configured to select model training parameters. This selection can be based on model performance feedback received from computing resources 101. Model optimizer 107 can be configured to provide trained models and descriptive information concerning the trained models to model storage 109.

Model storage 109 can include one or more databases configured to store data models and descriptive information for the data models. Model storage 109 can be configured to provide information regarding available data models to a user or another system. This information can be provided using interface 113. The databases can include cloud-based databases (e.g., AMAZON WEB SERVICES S3 buckets) or on-premises databases. The information can include model information, such as the type and/or purpose of the model and any measures of classification error.

Model curator 111 can be configured to impose governance criteria on the use of data models. For example, model curator 111 can be configured to delete or control access to models that fail to meet accuracy criteria. As a further example, model curator 111 can be configured to limit the use of a model to a particular purpose, or by a particular entity or individual. In some aspects, model curator 111 can be configured to ensure that a data model satisfies governance criteria before system 100 can process data using the data model. Additionally or alternatively, model curator 111 can be configured to index neural networks by indicators of patterns, character distributions, or other properties of unstructured data accepted as input to the neural networks.

Interface 113 can be configured to manage interactions between system 100 and other systems using network 115. In some aspects, interface 113 can be configured to publish data received from other components of system 100 (e.g., dataset generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide information received from model storage 109 regarding available datasets. In various aspects, interface 113 can be configured to provide data or instructions received from other systems to components of system 100. For example, interface 113 can be configured to receive instructions for generating data models (e.g., type of data model, data model parameters, training data indicators, training parameters, or the like) from another system and provide this information to model optimizer 107. As an additional example, interface 113 can be configured to receive data including sensitive portions from another system (e.g. in a file, a message in a publication and subscription framework, a network socket, or the like) and provide that data to dataset generator 103 or database 105.

Network 115 can include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

Log Parsing

Parsing unstructured data, such as log files, into structured data, such as relational databases, may be time consuming and difficult to accomplish without human intervention. Disclosed herein are improved systems and methods for efficiently parsing unstructured data to generate structured data. For example, a classifier may direct unstructured data to an appropriate neural network trained to parse unstructured data falling within a particular type, category, or the like. In this manner, the automated parsing can be more accurate than what is achievable using generalized neural networks, and any subjective human intervention required to select an appropriate neural network may be replaced or augmented with faster, automated rules.

As used herein, "unstructured" does not necessarily refer to data that is haphazard or lacking in discernible patterns. Rather, "unstructured" data may refer to data stored without logical connection among portions even if the data is stored, for example, as a text file with a pattern and delimiter that impart meaning to the data even though no logical connection is stored. Accordingly, the "structure" of any unstructured data may comprise patterns, delimiters, and other components of the data that impart meaning.

Figure 2A:
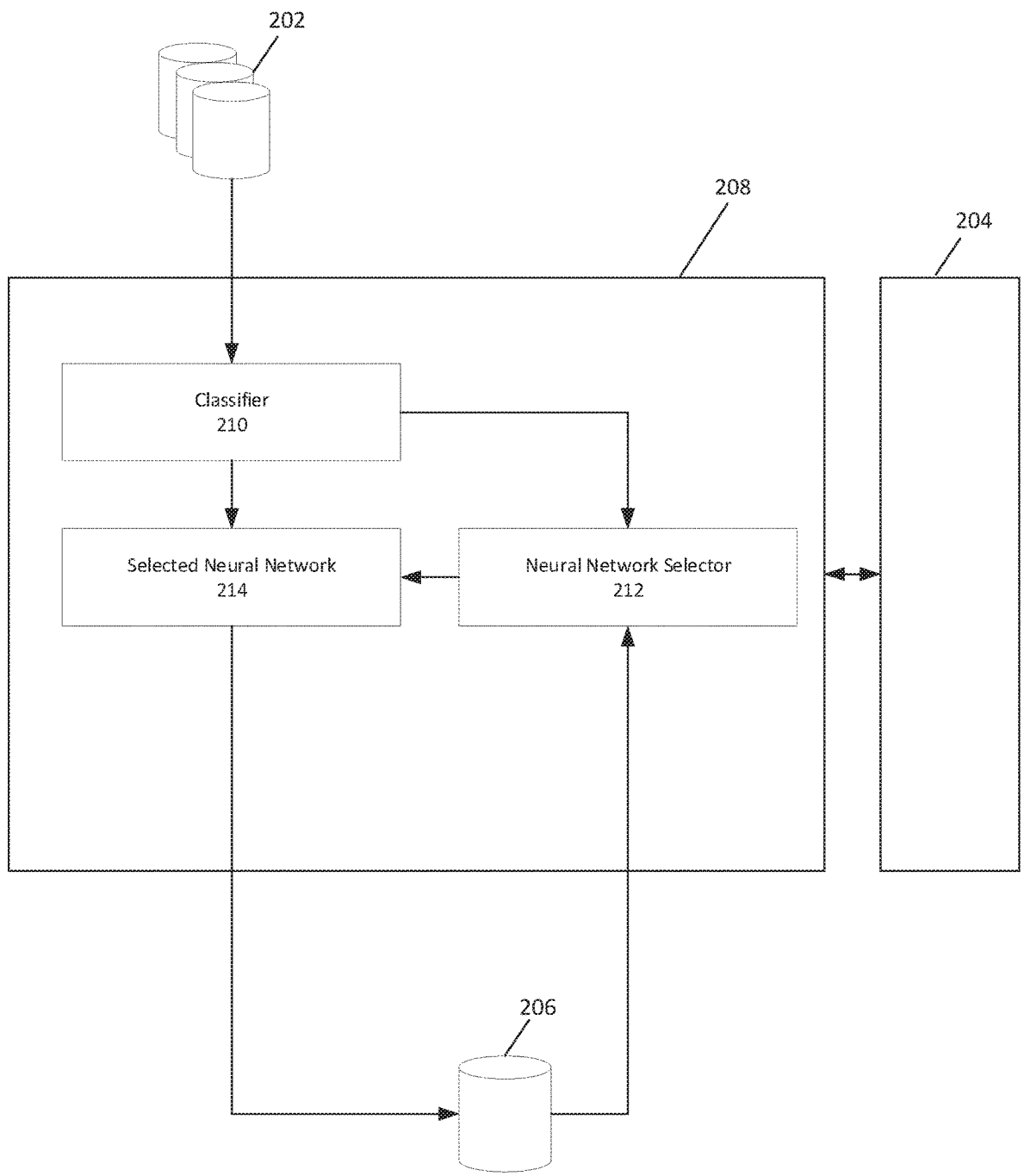
FIG. 2A depicts an exemplary system for parsing unstructured data using a classifier and a plurality of neural networks, consistent with disclosed embodiments.

FIG. 2A depicts an exemplary system 200 for parsing unstructured data, consistent with disclosed embodiments. System 200 may include one or more databases 202, one or more processors 204, and one or more databases 206. The one or more processors may execute one or more programs (e.g., classifier 210, neural network selector 212, and neural network 214) for generating structured data. The one or more programs may be stored in a memory 208, as depicted in FIG. 2A. System 200 may be implemented as a component of system 100 or may be a system separate from system 100.

Databases 202 may include one or more databases configured to store data for use by system 200. In some embodiments, databases 202 may be included in database 115 of system 100. Databases 202 can include cloud-based databases (e.g., AMAZON WEB SERVICES S3 buckets) and/or on-premises databases. In some embodiments, databases 202 may store unstructured data, such as log files, for parsing by system 200.

Databases 206 may also include one or more databases configured to store data for use by system 200. Databases 206 can include cloud-based databases (e.g., AMAZON WEB SERVICES S3 buckets) and/or on-premises databases. In some embodiments, databases 206 may store neural networks and/or structured data output by said neural networks. Database 206 may be included as a part of previously described database 115.

Classifier 210 may receive unstructured data from databases 202. The unstructured data may include log files of a particular category or type. A log type or category may be, for example, an operating system log, a Microsoft Office® log, a Java® log, or the like. Additionally or alternatively, a log may have been generated by a particular application, e.g., Google Chrome®, Microsoft Word®, Windows® 10 Update, or the like. Documents of the same type or category and/or generated by the same application may include the same or similar patterns and/or distributions (such as distributions of characters, integers, letters, alphanumeric characters, special characters, or the like).

Classifier 210 may identify a type or category of the unstructured data and/or a particular application that generated the unstructured data. In an embodiment, classifier 210 may calculate one or more distributions of at least one of characters, integers, letters, alphanumeric characters, special characters, or the like within the unstructured data to perform the identification. For example, classifier 210 may compare the calculated distribution(s) with one or more thresholds to perform the identification. Additionally or alternatively, classifier 210 may extract one or more feature vectors from the unstructured data. For example, classifier 210 may compare the calculated feature vector(s) with one or more representative feature vector(s) to perform the identification.

Although not depicted in FIG. 2A, processor 204 may further pre-process the unstructured data before application of classifier 210 and/or before application of neural network selector 212. For example, processor 204 may standardize delimiters within the unstructured data such that different entries within the unstructured data are all delimited by a space, a hyphen, a colon, a semicolon, a comma, or the like. Additionally or alternatively, processor 204 may remove excess spaces, special characters, or other repetitions not necessary to the structure of the unstructured data.

Neural network selector 212 may use output of classifier 210 (e.g., distribution(s), feature vector(s), or the like) to select a neural network for parsing the unstructured data. For example, neural network selector 212 may use thresholds, representative feature vectors, identifiers of a likely application that generated the unstructured data, or the like, to identify selected neural network 214. In some embodiments, neural network selector 212 may search an index in database(s) 206 using the output of classifier 210 to extract selected neural network 214.

Accordingly, selected neural network 214 may transform the unstructured data to structured data. Structured data may comprise relational data, graphical data, object-oriented data, or any other structured data including logical connections stored within the data rather than using delimiters, patterns, or the like to impart meaning. In some embodiments, selected neural network 214 may comprise a convolutional neural network, e.g., processing the unstructured data on a character-by-character basis. Additionally or alternatively, selected neural network 214 may comprise a recurrent neural network, e.g., processing the unstructured data such that earlier results of the nodes are input to the nodes further in time. Accordingly, selected neural network 214 may have been trained using backpropagation of error and/or backpropagation through time, as appropriate.

In any of the embodiments described above, selected neural network 214 may have been trained on unstructured data of the same type or category and/or generated by the same application as the unstructured data being parsed by system 200. Accordingly, selected neural network 214 may be more accurate than generalized parsing neural networks on account of its narrower training set and more focused parsing scope. In some embodiments, selected neural network 214 may have been trained using character-by-character analysis or using a character window (e.g., a window of 10 characters, 20 characters, 30 characters, 40 characters, 50 characters, 60 characters, a range in-between, or the like).

As explained above, structured data may comprise relational data, graphical data, object-oriented data, or any other structured data including logical connections stored within the data. Moreover, as depicted in FIG. 2A, the structured data may be output for storage, e.g., in databases 206. Additionally or alternatively, the structured data may be output to an external device, e.g., another server, a third-party data repository (e.g., AMAZON WEB SERVICES S3 buckets), a user such an administrator diagnosing a problem, or the like.

FIG. 2B is an illustration of exemplary log file 220 that is pre-processed into log file 230 before transformation to structured data 240 using selected neural network 214. As depicted in FIG. 2B, a log file may comprise text output by an application (e.g., an operating system as disclosed in the example of FIG. 2B). In some embodiments, log file 220 may be pre-processed to produce pre-processed data 230. In the example of FIG. 2B, the pre-processing includes removal of extra characters (e.g., extra spaces) and removal of delimiting colons, periods, and commas (and, thus, standardization of all delimiters to a single space), Additional or alternative pre-processing techniques may be used, as described herein.

As further depicted in FIG. 2B, selected neural network 214 may generate structured data 240 from pre-processed data 230 (or, in embodiments without pre-processing, from unstructured data 220). For example, as depicted in FIG. 2B, structured data 240 may comprise tabular data. Alternatively, structured data 240 may comprise any other form of relational data or other logically connected data such as graphical data, object-oriented data, or the like.

Figure 3:
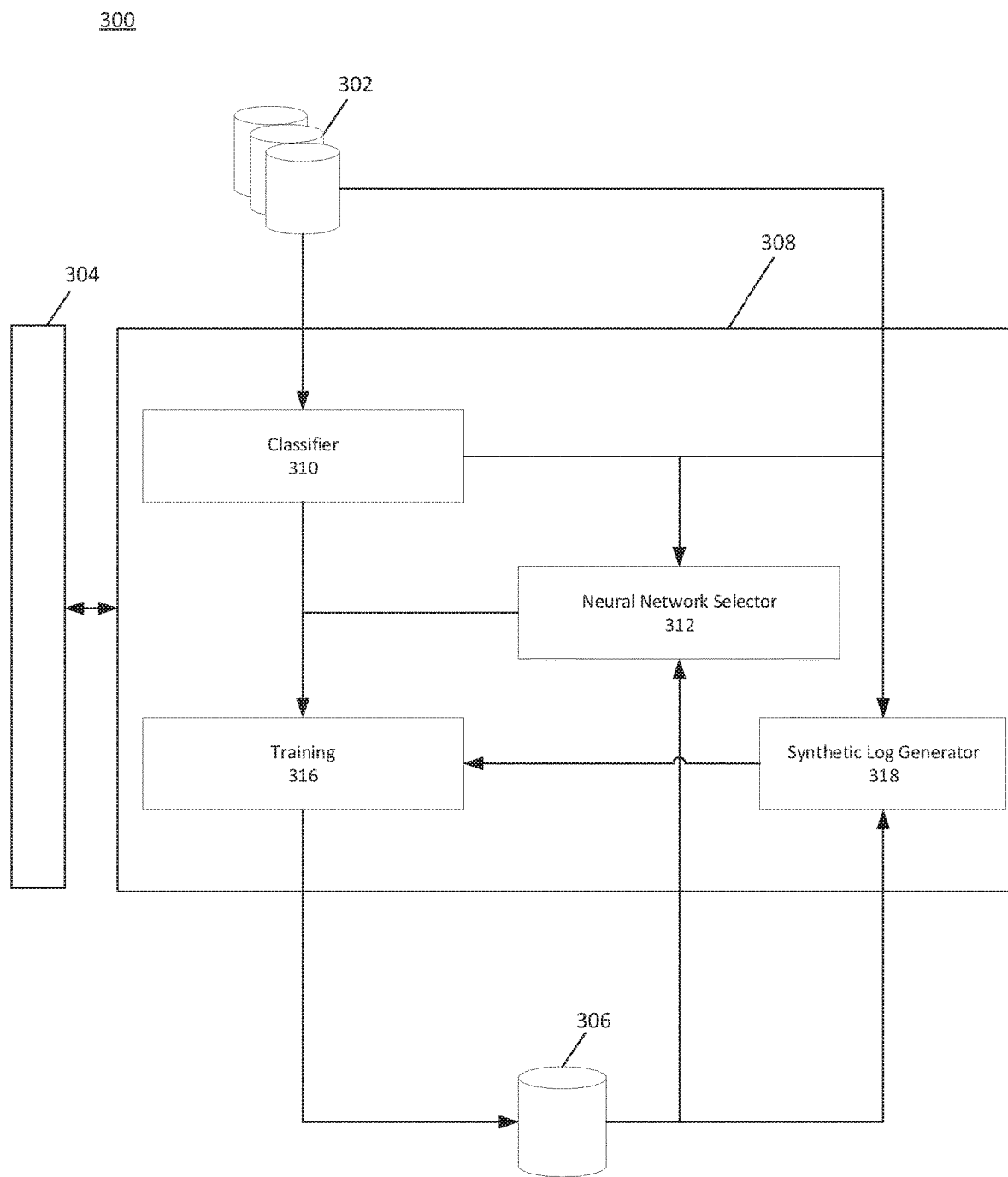
FIG. 3 depicts an exemplary system for training new neural networks using a selected template and synthetic data, consistent with disclosed embodiments.

FIG. 3 depicts an exemplary system 300 for training parsing neural networks, consistent with disclosed embodiments. System 300 may include one or more databases 302, one or more processors 304, and one or more databases 306. The one or more processors 304 may execute one or more programs (e.g., classifier 310, neural network selector 312, training program 316, and synthetic log generator 318) for training a template neural network. The one or more programs may be stored in a memory 308, as depicted in FIG. 3. System 300 may be implemented as a component of system 100 or may be a system separate from system 100.

Databases 302 may include one or more databases configured to store data for use by system 300. In some embodiments, databases 302 may be included in database 115 of system 100. Databases 302 can include cloud-based databases (e.g., AMAZON WEB SERVICES S3 buckets) and/or on-premises databases. In some embodiments, databases 302 may store unstructured data, such as log files, for parsing by system 200.

Databases 306 may also include one or more databases configured to store data for use by system 200. Databases 306 can include cloud-based databases (e.g., AMAZON WEB SERVICES S3 buckets) and/or on-premises databases. In some embodiments, databases 306 may store neural networks. Database 306 may be included as a part of previously described database 115.

Classifier 310 may receive unstructured data from databases 302. The unstructured data may include log files of a particular category or type. A log type or category may be, for example, an operating system log, a Microsoft Office® log, a Java® log, or the like. Additionally or alternatively, a log may have been generated by a particular application, e.g., Google Chrome®, Microsoft Word®, Windows® 10 Update, or the like. Documents of the same type or category and/or generated by the same application may include the same or similar patterns and/or distributions (such as distributions of characters, integers, letters, alphanumeric characters, special characters, or the like).

Classifier 310 may determine that a type or category of the unstructured data and/or that the application that generated the unstructured data is not known (e.g., not indexed in databases 306 or otherwise not associated with an existing trained neural network). In an embodiment, classifier 310 may calculate one or more distributions of at least one of characters, integers, letters, alphanumeric characters, special characters, or the like within the unstructured data to perform the identification. For example, classifier 310 may compare the calculated distribution(s) with one or more thresholds to perform the determination. Additionally or alternatively, classifier 310 may extract one or more feature vectors from the unstructured data. For example, classifier 310 may compare the calculated feature vector(s) with one or more representative feature vector(s) to perform the determination.

Although not depicted in FIG. 3, processor 304 may further pre-process the unstructured data before application of classifier 310 and/or before application of neural network selector 312. For example, processor 304 may standardize delimiters within the unstructured data such that different entries within the unstructured data are all delimited by a space, a hyphen, a colon, a semicolon, a comma, or the like. Additionally or alternatively, processor 304 may remove excess spaces, special characters, or other repetitions not necessary to the structure of the unstructured data.

Neural network selector 312 may use output of classifier 310 (e.g., distribution(s), feature vector(s), or the like) to select a neural network for training to parse the unstructured data. For example, neural network selector 312 may use thresholds, representative feature vectors, identifiers of a likely application that generated the unstructured data, or the like, to identify a selected neural network. The selected neural network may—based on the thresholds, representative feature vectors, identifiers of a likely application, or the like—be the best candidate neural network for parsing the unstructured data.

Additionally or alternatively, neural network selector 312 may apply a plurality of stored neural networks in databases 306 to the unstructured data. For example, neural network selector 312 may obtain a plurality of outputs (e.g., a plurality of structured data outputs corresponding to the unstructured data). Neural network selector 312 may then identify the selected neural network based on the outputs, e.g., by selecting a neural network whose output has an associated loss function that is closest to a minimum, by selecting a neural network whose output has a highest robustness measure, or the like. In some embodiments, neural network selector 312 may use a classifier to score the outputs, e.g., by robustness, loss function minima, or the like. Accordingly, neural network selector 312 may select the neural network whose output has the highest (or lowest) score.

In such embodiments, neural network selector 312 may apply a subset of a plurality of stored neural networks in databases 306 to the unstructured data. For example, neural network selector 312 may use thresholds, representative feature vectors, identifiers of a likely application that generated the unstructured data, or the like, as explained above, to identify candidate neural networks that comprise the subset. Additionally or alternatively, the classifier may identify candidate neural networks by searching the unstructured data for one or more known keys. As used herein, a "key" may refer to a predetermined one or more characters and/or a predetermined pattern that all unstructured data input into the candidate neural network share. Neural network selector 312 may further use frequencies of the one or more keys within the unstructured data to identify the candidate neural networks. Thereafter, neural network selector 312 may select a single neural network of the candidates using any of the techniques described above.

Accordingly, neural network selector 312 may reset the weights and activation functions of the selected neural network but retain the structure of the selected neural network to obtain the template. For example, the template may comprise the same layers and nodes of the selected neural network but with default activation functions and values for weights.

Training program 316 may train the template using unstructured data of the same type or category and/or generated by the same application as the unstructured data previously classified by classifier 310. For example, classifier 310 may extract additional unstructured data from databases 302 that correspond to the new type or category and/or generated by the new application as the unstructured data previously classified by classifier 310. Additionally or alternatively, synthetic log generator 318 may generate synthetic unstructured data following a template corresponding to the same type or category and/or appearing to have been generated by the same application as the unstructured data previously classified by classifier 310. Synthetic log generator 318 may be trained and generate synthetic data as explained below with respect to FIG. 4. For example, synthetic log generator 318 may develop templates based on character distribution within a log file, similar to the development of templates based on pixel distribution within a document, as described below with respect to FIG. 6. The template may thus comprise a text file with spaces between delimiters where synthetic log data may be inserted.

Synthetic log generator 318 may be used when no additional unstructured data in databases 302 corresponds to the new type or category of and/or was generated by the new application which generated the unstructured data previously classified by classifier 310. Additionally or alternatively, synthetic log generator 318 may be used when the amount of additional unstructured data in databases 302 is insufficient. The amount of additional unstructured data may be "insufficient" when below a threshold (e.g., at least 100 log files, at least 200 log files, or the like) and/or when training of the template using the additional unstructured data does not result in a corresponding loss function of the template being minimized, being within a threshold of a minimum, or converging within a threshold number of training cycles.

As explained above, the trained neural network may comprise a convolutional neural network, a recurrent neural network, or any other neural network trained to parse unstructured data. Moreover, as depicted in FIG. 3, the trained neural network may be output for storage, e.g., in databases 206. Additionally or alternatively, the trained neural network may be output to an external device, e.g., another server, a third-party data repository (e.g., AMAZON WEB SERVICES S3 buckets), a user device for use in parsing, or the like.

Form Field Recognition

Analyzing large volumes of files containing digital documents to extract data may be time consuming and difficult to accomplish without human intervention. Disclosed herein are improved systems and methods for efficiently analyzing digital documents to generate document templates and to generate synthetic data. For example, synthetic data may be generated using a synthetic dataset model, which itself may be generated based on actual data contained in one or more digital documents. The synthetic data may be similar to the actual data in terms of values, value distributions (e.g., univariate and multivariate statistics of the synthetic data may be similar to that of the actual data), structure and ordering, or the like. In this manner, the data model for a machine learning application can be generated without directly using the actual data. As the actual data may include sensitive information or may be missing data, and generating the data model may require distribution and/or review of training data, use of the synthetic data can protect privacy and security of entities and/or individuals whose activities are recorded by the actual data and can be used to generate a full dataset by populating empty fields with expected results.

Figure 4:
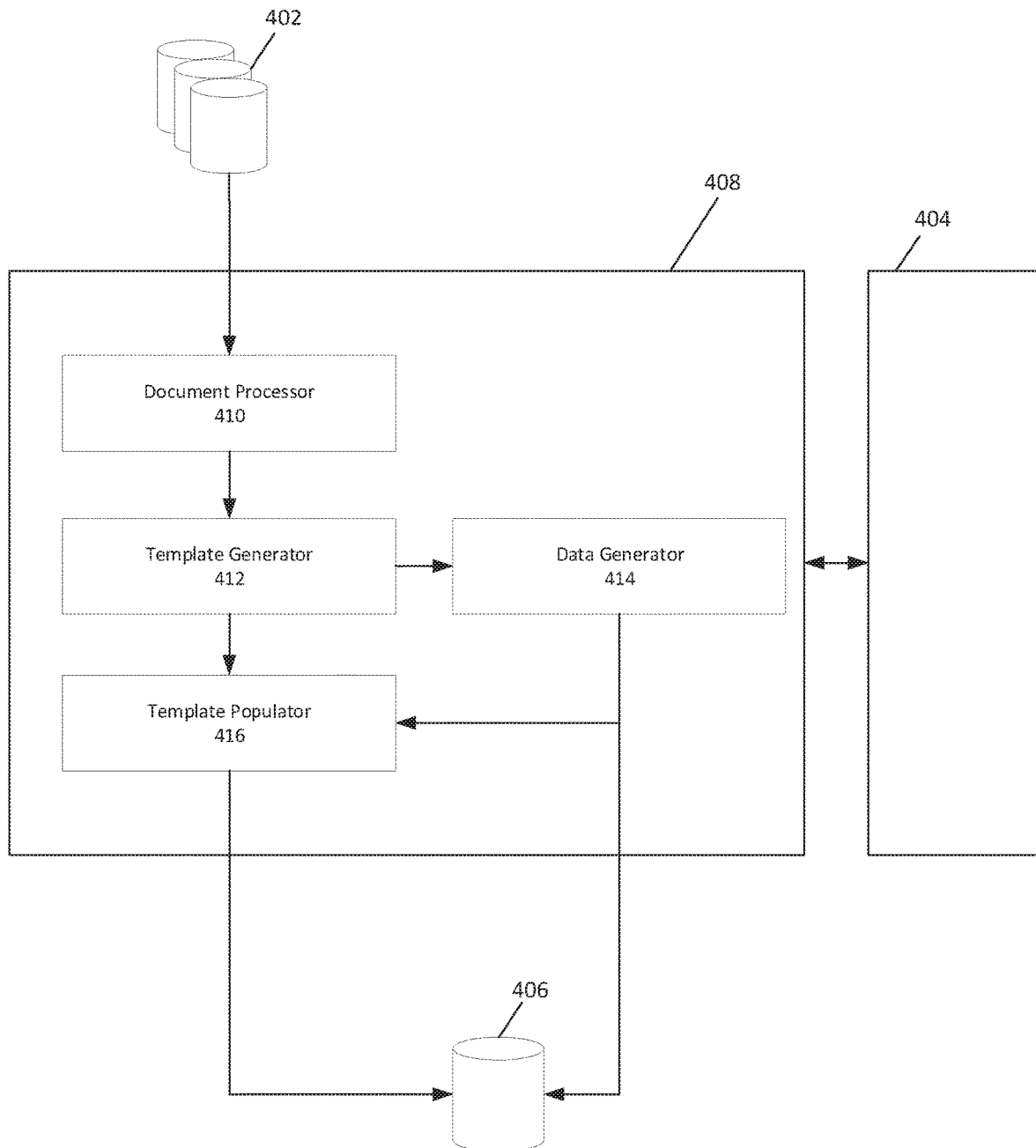
FIG. 4 depicts an exemplary system for generating synthetic data, consistent with disclosed embodiments.

FIG. 4 depicts an exemplary system 400 for generating synthetic data, consistent with disclosed embodiments. System 400 may include one or more external databases 402, one or more processors 404, and database 406. The one or more processors may execute one or more programs (e.g., document processor 410, template generator 412, data generator 414, and template populator 416) for generating synthetic data and/or synthetic documents. The one or more programs may be stored in a memory 408, as depicted in FIG. 4. System 400 may be implemented as a component of system 100 or may be a system separate from system 100.

External databases 402 may include one or more databases configured to store data for use by system 400. In some embodiments, external databases 402 may be included in database 115 of system 100. The databases can include cloud-based databases (e.g., AMAZON WEB SERVICES S3 buckets) or on-premises databases. In some embodiments, external databases 402 may include databases owned by third-party systems and/or may include publicly accessible databases. For example, databases 402 may include public records databases.

Database 406 may include one or more databases configured to store data for use by system 400. The databases can include cloud-based databases (e.g., AMAZON WEB SERVICES S3 buckets) or on-premises databases. Database 406 may store synthetic data, synthetic documents, metadata associated with actual and/or synthetic data, etc. Database 406 may be included as a part of previously described database 115.

Document processor 410 may receive a set of documents from databases 402. The set of documents may include documents of a particular document type. A document type may be, for example, a driver's license, application, tax form, or the like. In another embodiment, a document type may be a driver's license from a particular state or a driver's license from a particular state and particular year. Documents of the same document type may be of the same dimensions and contain the same number of pixels.

Document processor 410 may use optical character recognition (OCR), pattern matching, object detection or other techniques to determine the value of each pixel in each of the documents included in the set of documents. In an embodiment, document processor 410 may perform background subtraction prior to performing OCR on a document to reduce noise. In an embodiment, document processor 410 may rotate, align, skew, or scale one or more documents in the set of documents such that each pixel in a respective (x,y) position of a first document aligns with the corresponding pixels of the other documents in the set.

Document processor 410 may generate a distribution of pixel values for each (x,y) position in the set of documents and may generate a mean and standard deviation for each distribution. In other embodiments, document processor may apply a machine learning algorithm to the set of documents to generate pixel information. In another embodiment, document processor 410 may apply one or more optimization techniques including, for example, applying post-processing algorithms, constraining OCR to a particular lexicon associated with the document type, pattern matching, and the like.

Template generator 412 may receive the document data, including pixel information, document type, etc., from document processor 410 and generate a template for the document type associated with the set of documents. For example, template generator 412 may determine, based on the document data, one or more sets of pixels associated with an expected background and one or more sets of pixels associated with input fields. Documents and templates will be discussed inn further detail with respect to FIGS. 5A and 5B below.

Expected background may refer to portions of a document that are the same for multiple documents in a set of documents. For example, expected background may refer to corresponding pixels having the same value. In other embodiments, expected background may include a set of pixels whose standard deviation is below a certain threshold standard deviation. In yet another embodiment, template generator 412 may apply an algorithm to determine whether a pixel and its adjacent pixels have distributions within a threshold standard deviation. Examples of expected background of a document type may be boilerplate text, input field prompts and/or labels (e.g., "Name," "Address," "What is your age?" and the like), watermarks, etc.

Input fields may be sets of pixels having different values in one or more of the documents in the document set. For example, if the document type is an application form (e.g., an application for a bank account, an application for a loan, an application to an educational institution, etc.), input fields may be the areas of the application containing applicant-specific information such as, for example, account number, name, address, etc. Template generator 412 may analyze the distributions of pixels and include pixels whose distributions have a standard distribution greater than or equal to a threshold distribution. In other embodiments, template generator 412 may analyze adjacent pixels to determine the bounds within which input is expected. For example, the determined bounds may define a form field. In another embodiment, template generator 412 may apply one or more pattern matching algorithms to identify areas of the set of the documents indicative of lines, checkboxes, radio buttons, text boxes, etc. into which a user may enter information. For example, pattern matching may be used to indicate a region of interest that may bound an input field.

In some embodiments, an input field may have a minimum threshold number of pixels. For example, a region of adjacent pixels may be required to have a minimum area, e.g., a minimum number of adjacent pixels whose distributions have at least a threshold distribution. Thus, noise resulting from low-resolution documents, erroneous marks, etc. may not be captured as input fields in the template.

Data generator 414 may use OCR or another technique to extract data from the input fields identified by the template generator 412. In some embodiments, data generator 414 may use OCR to recognize words, letters, numerals, marks, signatures, etc. within the bounds of the input field in each document of the document set. For each document, the system 400 may store, e.g., in database 406, information extracted from each input field as well as metadata, e.g., indication of whether a field is blank, statistics related to the number of times a field is blank in a set of documents, etc.

Data generator 414 may apply a machine learning algorithm or other algorithm to classify the type of information stored in each input field. For example, a classifier may identify whether the input field is expected to contain a name, a first name, a last name, a street number, a street name, etc. A classifier may further identify a group of one or more input fields. For example, a set of three input fields having classifiers "First Name," "Last Name," and "Middle Initial," may form a group classified as "Full Name." Data generator 414 may apply one or more machine learning algorithms to assign a classifier to an input field and subsequently group one or more input fields under a single classifier based on their respective classifiers.

Data generator 414 may store, for each document, information extracted from each input field and the classifier associated with each input field in a relational database, e.g., database 414. Additionally, data generator 414 may calculate one or more statistics associated with the information extracted from one or more input fields in the set of documents.

In another embodiment, data generator 414 may generate synthetic data. For example, data generator 414 may cluster documents of a particular document type containing similar information (e.g., having particular characteristics) and determine expected values for the input fields included in the document type. Data generator 414 may generate synthetic datasets based on the expected data associated with each cluster. Documents with similar characteristics may be indicative of customers having similar demographics and thus may be used to generate synthetic datasets for various demographic groups.

Template populator 416 may receive synthetic data from data generator 414. Template populator 416 may insert the synthetic data into the corresponding input fields of a template, thereby creating a synthetic document of a particular document type containing synthetic data based on actual data. Thus, a set of synthetic documents may be used as a training set without compromising customer privacy. In other embodiments, template populator 416 may be used to populate blank input fields of an actual document. Data generator 414 may assign the information contained in the actual document to a cluster having particular characteristics. The expected value associated with the cluster may be inserted into the input field of the actual document to generate a complete document.

Template populator 416 may generate completed documents and/or synthetic documents such that a corpus of documents is created and stored in database 406. In some embodiments, the corpus of documents may be used as a training dataset. In another embodiment, the synthetic documents and/or synthetic data may be used to train the input field classifiers.

Figure 5A:
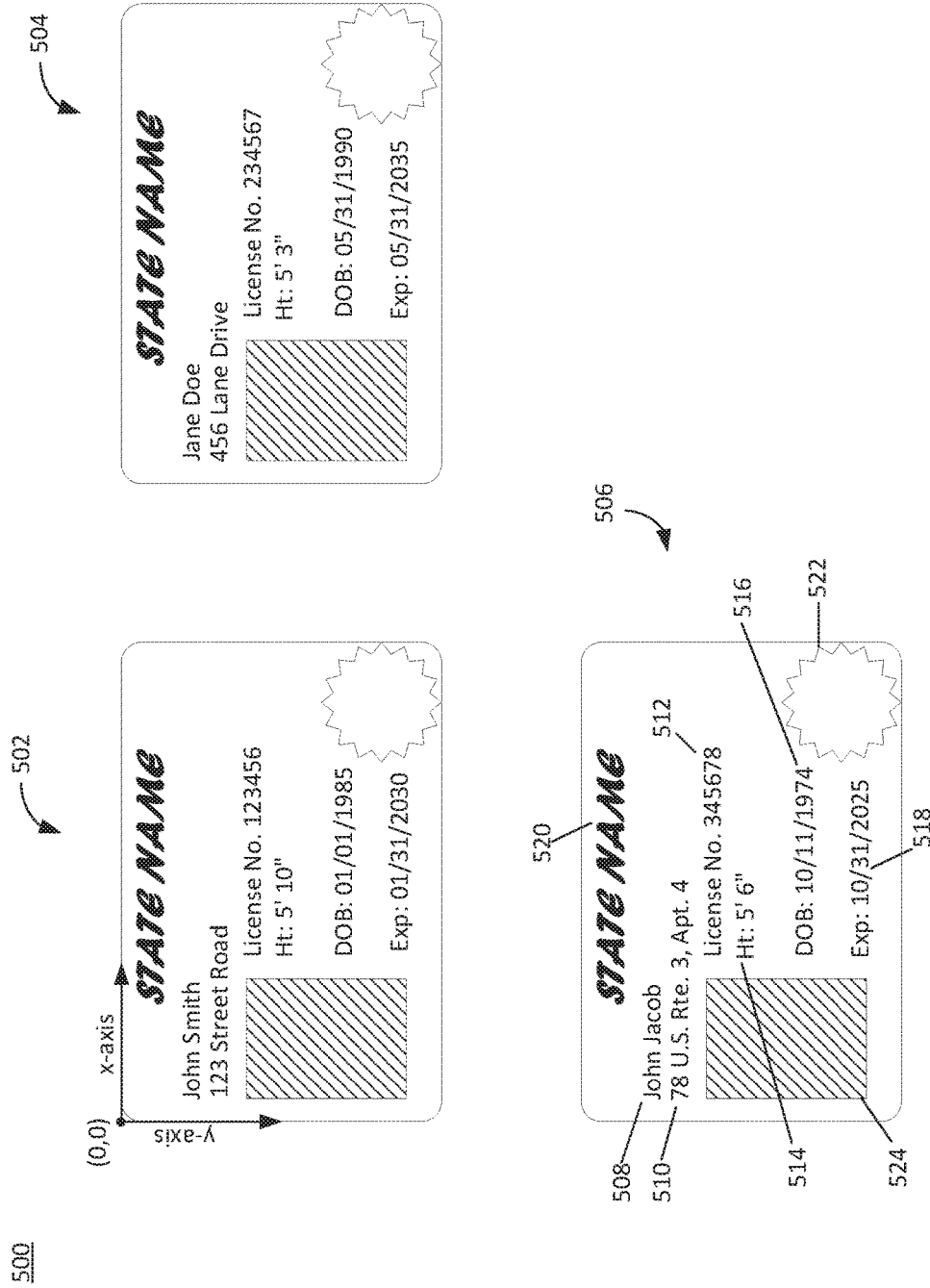
FIG. 5A depicts an exemplary set of documents used to generate synthetic data, consistent with disclosed embodiments.

FIG. 5A is an illustration of exemplary set of documents 500 that may be stored in databases 402. The set of documents 500 may include a number of pdf documents of photocopies of customer's driver's licenses 502, 504, and 506. Document processor 410 may align documents such that corresponding pixels have the same (x, y) coordinates. In the example illustrated in FIG. 5A, driver's licenses 502, 504, and 506 may include a name 508, street address 510, license number 512, height information 514, date of birth (DOB) 516, and expiration date 518. Driver's licenses 502, 504, and 506 may include other common elements, for example, state name 520, state seal 522, and identification (ID) picture 524.

Document processor 410 may use OCR or another document processing algorithm to identify pixel values for the pixels at corresponding positions of driver's licenses 502, 504, and 506. Shown in FIG. 5B, template generator 412 may identify regions in which the pixel values are the same, or within a certain standard deviation, in documents 502, 504, 506. Using the pixel information generated by document processor 410, template generator 412 may generate an expected background 526. The expected background 526 may include features common to multiple documents (e.g., 502, 504, 506) in the document set 500. For example, common features may include state name 520, state seal 522, and/or text preceding personal information. In some embodiments, document processor 410 may use blending or another image processing algorithm to account for small variances between each of the documents.

Template generator 412 may additionally identify regions of the documents (502, 504, 506) containing differing information. Template generator 412 may create bounds of each input field, i.e., of an area or areas of the document containing information that is different from that contained in analogous regions of the other documents, e.g., identification information, expiration date, ID photo, etc. Template generator 412 may combine the expected background 526 with the determined input fields 528 to generate a template 530 for the document type of the set of documents 500.

Figure 6A:
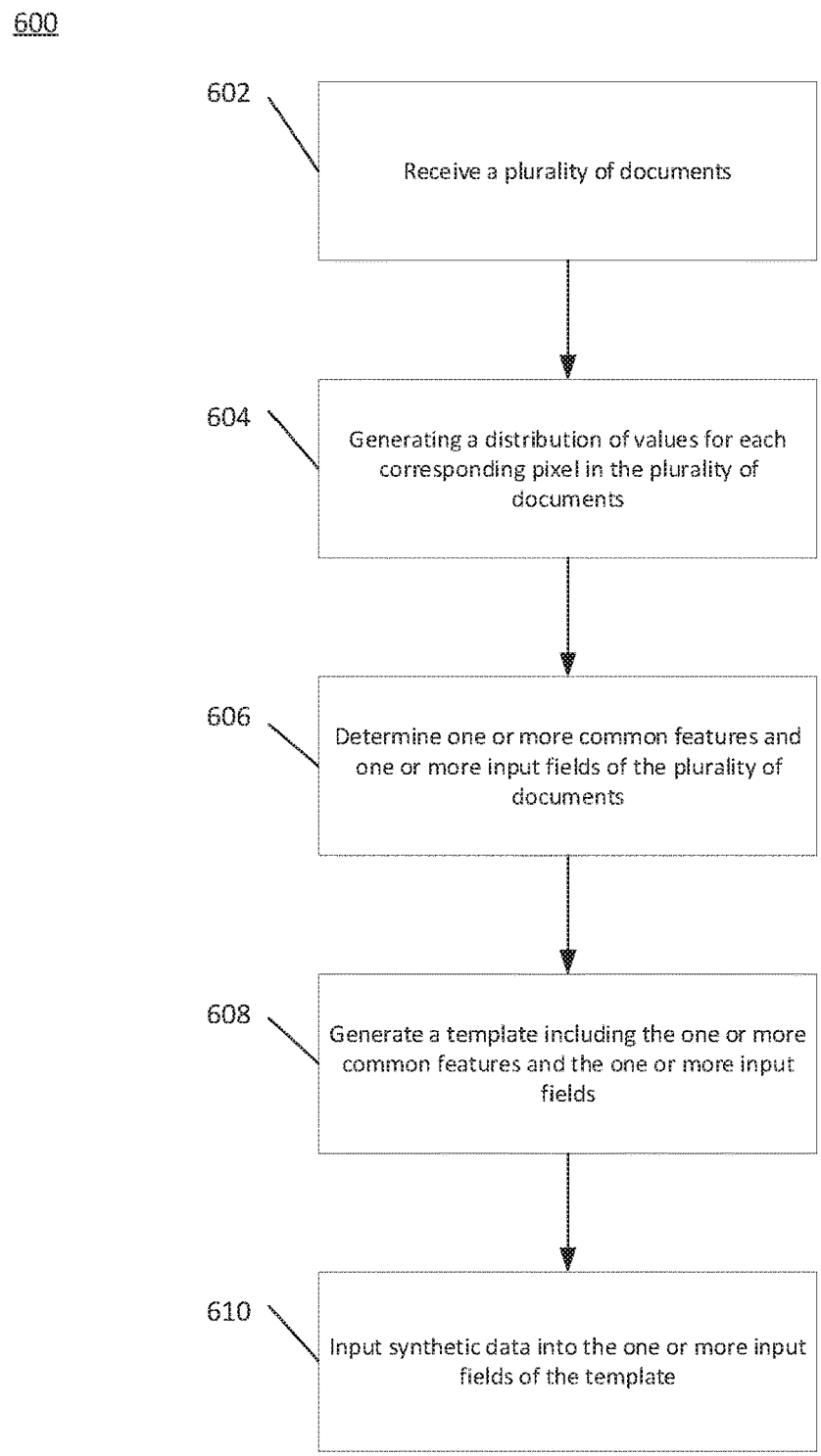
FIG. 6A depicts an exemplary process for generating synthetic documents, consistent with disclosed embodiments.

FIG. 6A is a flow diagram of an exemplary process 600 for generating synthetic data consistent with disclosed embodiments. Process 600 may be executed by a system, e.g., system 400 described above.

At step 602, a processor, e.g., processor 404 of system 400, may receive a set of documents from one or more databases, e.g., databases 402. The documents may be of the same document type. Documents may include digital copies or digital documents storing application information, identifying documents (driver's license, passport, etc.), demographic information, and the like.

At step 604, the processor may generate a distribution of values for each set of corresponding pixels in the set of documents. For example, in a set of one hundred documents, the documents being 800×800 pixels, a distribution of values for the pixel at position (0,0), (0,1), (0,2), and so on, may be generated. The processor may determine a mean and standard deviation for the distributions of values.

At step 606, the processor may identify one or more common features and one or more input fields in the set of documents. For example, template generator 412 may evaluate the distributions generated during step 604 to determine which pixels have distributions whose standard deviations are less than or equal to a threshold value. Pixels having low standard deviations may be considered to be common features shared by the documents in the set of documents (for example, expected background 526 as shown in FIG. 5B).

Figure 5B:
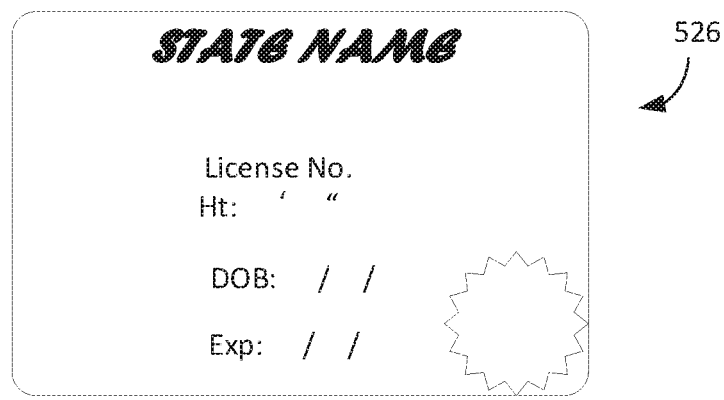
FIG. 5B depicts an exemplary document template, consistent with disclosed embodiments.
Figure 5B:
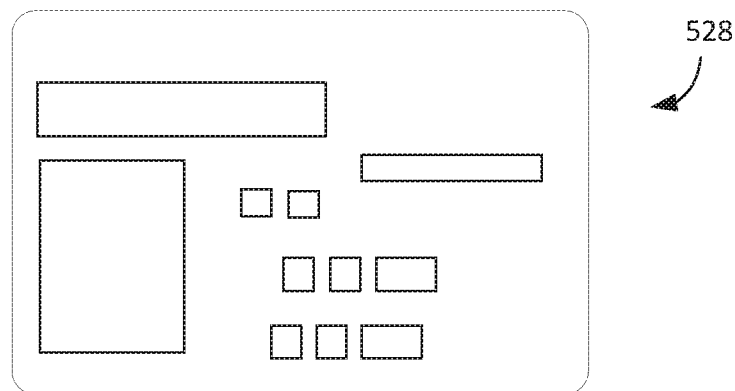
Figure 5B:
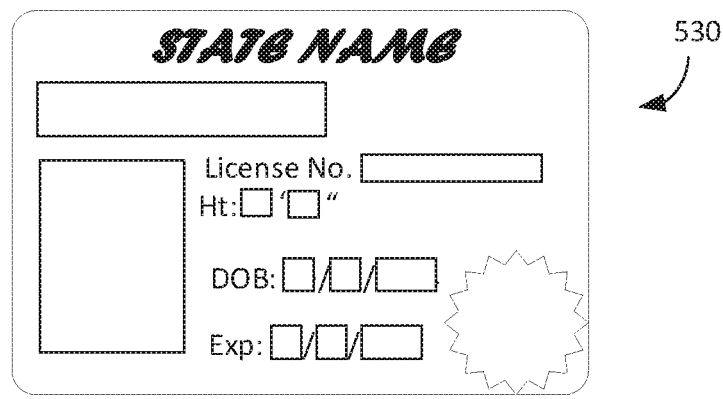

Pixels whose distributions have a standard deviation greater than or equal to a threshold value, may be identified to be input fields (for example, input fields 528 as shown in FIG. 5B). In some embodiments, input field bounds may be determined based on an algorithm. For example, input field bounds may be determined by analyzing the distributions of adjacent pixels. In some embodiments, input field bounds may have a minimum required area.

At step 608, the processor may generate a template (for example, template 530 shown in FIG. 5B) for the document type of the set of documents by combining the expected background and the input fields. In some embodiments, template generator 412 may calculate an average value of a plurality of pixels in the expected background to generate the template background. In another embodiment, template generator 412 may implement a blending process to generate the template based on the set of documents.

In some embodiments, the generated template may be used to automate a data extraction process. For example, the processor may receive one or more documents of a particular known document type. Rather than analyzing each document, i.e., performing OCR or other visual characterization process, the processor may only perform such analysis within the bounds of the identified input fields. Thus, the resources and time required to extract data from a large set of documents may be reduced.

At step 610, the processor may insert data into one or more of the input fields to generate a synthetic document. Data inserted into the input fields may be actual data stored in databases 402 and/or synthetic data stored in database 406. Step 610 may be repeated to generate a corpus of synthetic documents that may be used, for example, to train a learning algorithm. Synthetic documents and their associated metadata may be stored in a relational database, e.g., database 406.

In some embodiments, one or more input fields may be associated with one or more classifiers. A machine learning algorithm may be applied to the corpus of synthetic documents to train the classifier(s). Additionally, metadata associated with each document in the set of documents may be used to train one or more algorithms.

Figure 6B:
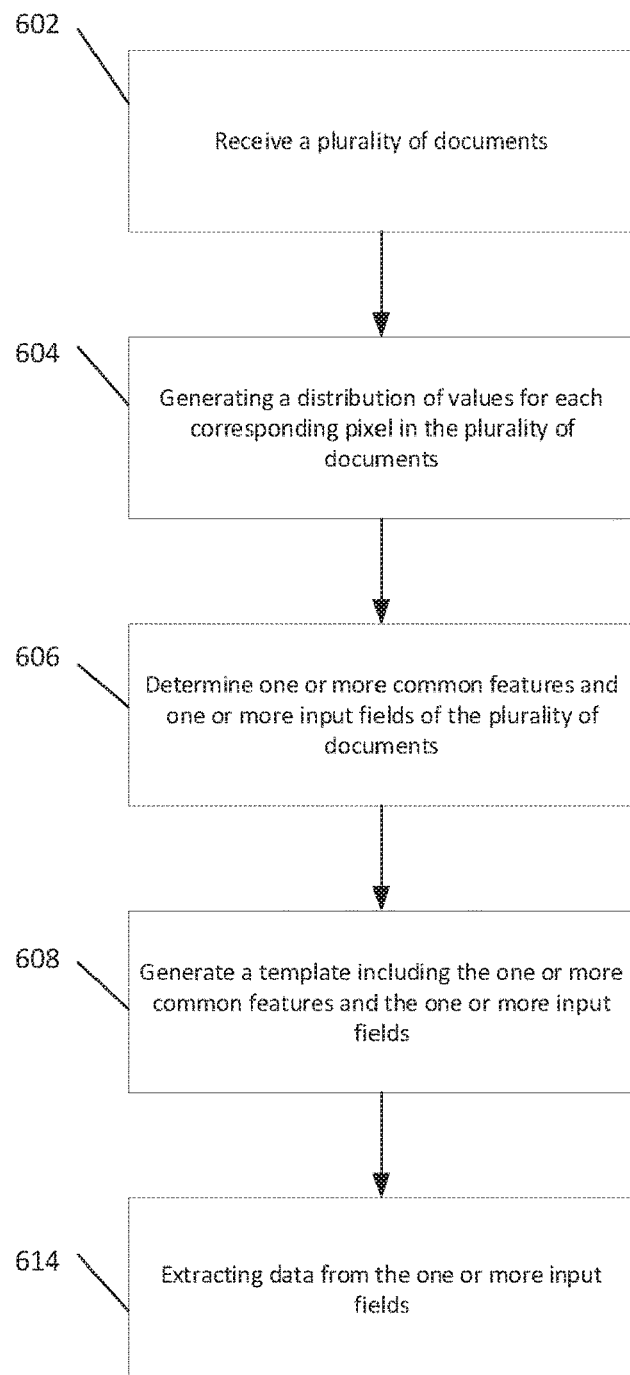
FIG. 6B depicts an exemplary process for generating synthetic data, consistent with disclosed embodiments.

FIG. 6B is a flow diagram of an exemplary process 612 for generating synthetic data consistent with disclosed embodiments. Process 612 may be performed by a processor, e.g., processor 404. Process 612 may include steps 602-608 as described above with respect to FIG. 6A.

Following step 608, as described above, at the processor may execute step 614 by using OCR or another process to extract information contained within each input field for each document in the set of documents. For example, the processor may perform an OCR operation on the pixels bounded by each identified input field and store the information detected using OCR. The processor may then store the extracted information in a relational database, e.g., database 406. The processor may also extract metadata, for example, the number of times a certain field has been left blank. Extracted metadata may also be stored in database 406. In another embodiment, the processor may apply one or more algorithms to the extracted data to determine an expected value for each input field. The processor may further cluster data into groups associated with customers having similar characteristics and determine expected values for each cluster. The calculated expected values may be used to generate synthetic datasets that may be used to train one or more learning algorithms, or that may be used to populate the document template generated in process 600, thereby creating a corpus of synthetic documents.

The corpus of synthetic documents may then be used in training one or more models. In other embodiments, the corpus of documents and/or synthetic data may be used to train classifiers to optimize the form field identification process. In another embodiment, synthetic data may be used to train an OCR or other document processing program to distinguish one or more document characteristics. For example, synthetic data may be used to train a program to identify handwritten information, to identify typed information, to identify the type of data expected in an input field (e.g., textual, numeric, Boolean), and/or to identify a document type based on the expected background and/or input fields.

Figure 7:
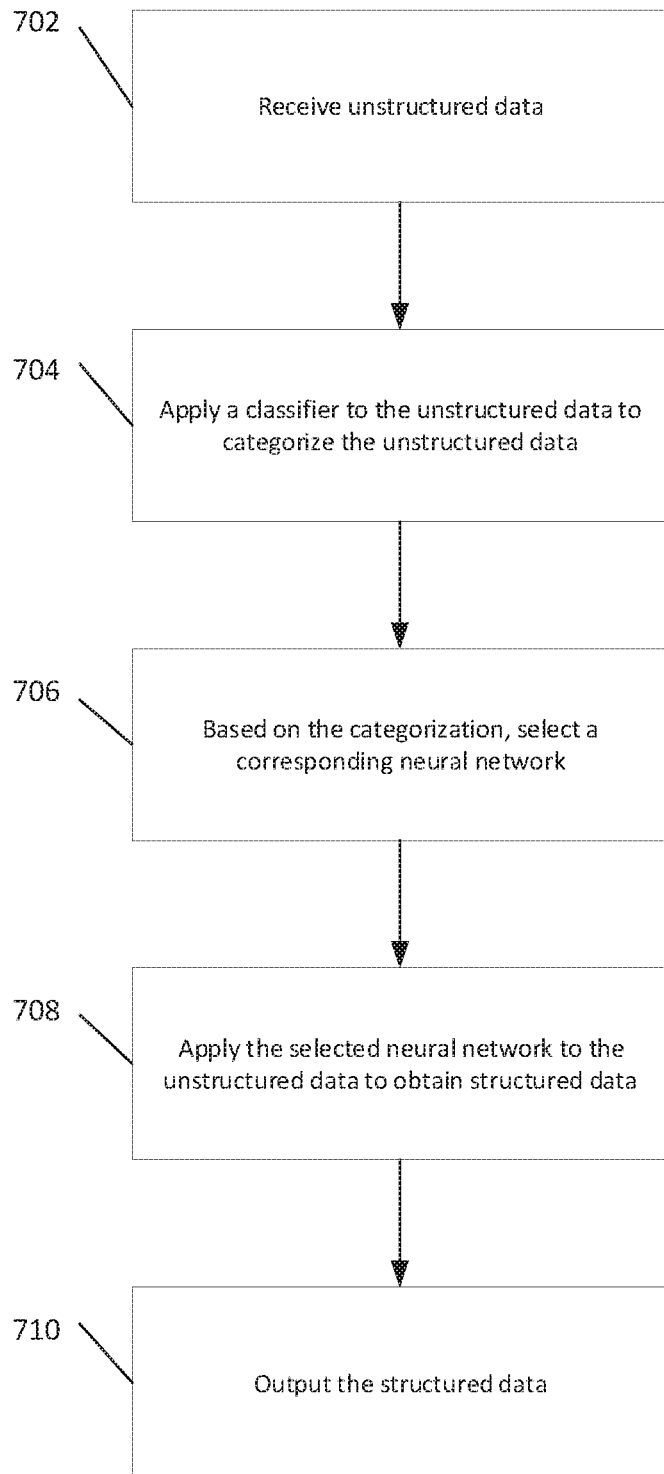
FIG. 7 depicts an exemplary process for parsing unstructured data, consistent with disclosed embodiments.

FIG. 7 is a flow diagram of an exemplary process 700 for parsing unstructured data consistent with disclosed embodiments. Process 700 may be executed by a system, e.g., system 200 described above.

At step 702, a processor, e.g., processor 204 of system 200, may receive unstructured data, e.g., from one or more databases such as databases 202 and/or input by a user. The unstructured data may comprise a log file. For example, the log file may have been generated by at least one application, such as an operating system and/or another computer program executed on top of the operating system (e.g., a web browser, a word processor, or the like) or under the operating system (e.g., a hardware driver or the like).

At step 704, the processor may apply a classifier to the unstructured data to identify a type of the unstructured data. As explained above, a log type or category may be, for example, an operating system log, a Microsoft Office® log, a Java® log, or the like. In some embodiments, the classifier may comprise at least one of a linear classifier, a bag-of-words model, or a character-level convolutional neural network.

Additionally or alternatively, the processor may apply a classifier to the unstructured data to identify an application having generated the unstructured data (which may comprise a log file). For example, a log may have been generated by a particular computer program such as Google Chrome®, Microsoft Word®, Windows® 10 Update, or the like.

In any of the embodiments described above, the processor may apply a classifier to the unstructured data to identify a distribution of one or more letters, a distribution of one or more integers, a distribution of one or more special characters, or a distribution of one or more alphanumeric characters. Additionally or alternatively, the classifier may identify the type and/or the application by searching the unstructured data for one or more known keys associated with the type and/or the application. As used herein, a "key" may refer to a predetermined one or more characters and/or a predetermined pattern that all unstructured data of the type and/or generated by the application share. For example, the one or more known keys may comprise at least one alphanumeric string associated with the type and/or the application.

At step 706, based on the identification, the processor may select a corresponding neural network. In embodiments where the classifier identifies a distribution, the selection may be based on the distribution. For example, selecting the corresponding neural network may comprise determining a neural network having an associated distribution range such that the distribution identified by the classifier is within the range. Additionally or alternatively, selecting the corresponding neural network may comprise determining a neural network having an associated distribution that is within a threshold of the distribution identified by the classifier.

In embodiments where the classifier identifies a plurality of distributions, the selection may be based on the plurality of distributions. For example, selecting the corresponding neural network may comprise determining a neural network having associated distribution ranges such that the distributions identified by the classifier are within the associated distribution ranges. Additionally or alternatively, selecting the corresponding neural network may comprise determining a neural network having associated distributions that are within corresponding thresholds of the distributions identified by the classifier.

In embodiments where the identifies a type of the unstructured data and/or an application having generated the unstructured data, the processor may select a corresponding neural network trained to parse log files from the application. For example, neural networks may be stored, e.g., in databases 206, indexed by the type and/or by the identified application and retrieved using the index.

In any of the embodiments described above, the corresponding neural network may comprise at least one of a recurrent neural network or a convolutional neural network. For example, the corresponding neural network may comprise a neural network trained using a character-by-character training or using a character window. In some embodiments, the character window may be between 50 characters and 60 characters.

At step 708, the processor may apply the selected neural network to the unstructured data to obtain structured data. In embodiments where the unstructured data comprises a log file, the processor may apply the selected neural network to the log file to obtain structured data corresponding to the unstructured data of the log file.

At step 710, the processor may output the structured data. For example, outputting the structured data may comprise at least one of storing the structured data or transmitting the structured data to an external device.

In some embodiments, as described above, the structured data may comprise at least one of relational data, graphical data, or object-oriented data. For example, the structured data may comprise tabular data corresponding to the unstructured data. In such an example, the processor may output to the tabular data to a relational database.

Method 700 may further include additional steps. For example, method 700 may further include pre-processing the unstructured data (which may comprise a log file) to standardize delimiters within the unstructured data. Additional or alternative pre-processing may be used, as described above.

Figure 8:
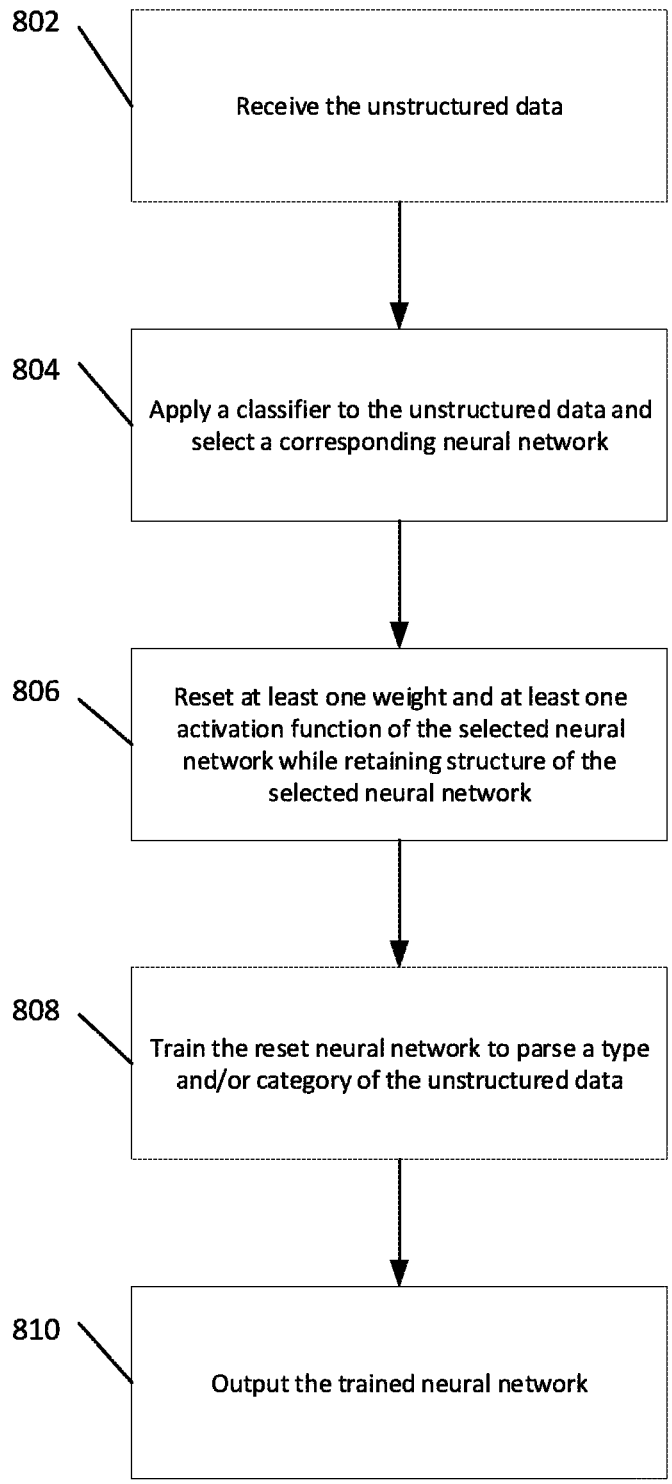
FIG. 8 depicts an exemplary process for training a neural network to parse unstructured data, consistent with disclosed embodiments.

FIG. 8 is a flow diagram of an exemplary process 800 for training a neural network to parse unstructured data consistent with disclosed embodiments. Process 800 may be executed by a system, e.g., system 300 described above.

At step 802, a processor, e.g., processor 304 of system 300, may receive unstructured data, e.g., from one or more databases, such as databases 302, and/or input by a user. The unstructured data may comprise a log file. For example, the log file may have been generated by at least one application, such as an operating system and/or another computer program executed on top of the operating system (e.g., a web browser, a word processor, or the like) or under the operating system (e.g., a hardware driver or the like).

At step 804, the processor may apply a classifier to the unstructured data to determine that the unstructured data comprises a new category of unstructured data. As explained above, a log type or category may be, for example, an operating system log, a Microsoft Office® log, a Java® log, or the like. In some embodiments, the classifier may comprise at least one of a linear classifier, a bag-of-words model, or a character-level convolutional neural network. As used herein, a "new" category may refer to a category for which a neural network has not been previously trained and/or indexed, e.g., in databases 306.

Additionally or alternatively, the processor may apply a classifier to the unstructured data to classify the unstructured data as data generated by a new application. For example, a log may have been generated by a particular computer program such as Google Chrome®, Microsoft Word®, Windows® 10 Update, or the like. As used herein, a "new" program may refer to a program for which a neural network has not been previously trained and indexed, e.g., in databases 306. In some embodiments, the classifier may comprise at least one of a linear classifier, a bag-of-words model, or a character-level convolutional neural network.

In some embodiments, the processor may apply a classifier to the unstructured data to identify a distribution of one or more letters, a distribution of one or more integers, a distribution of one or more special characters, or a distribution of one or more alphanumeric characters and, based on the distribution, determine that a format of the unstructured data differs from a set of known formats. For example, determining that the format of the unstructured data differs from the set of known formats may comprise determining that the distribution exceeds one or more thresholds of expected distributions associated with a plurality of neural networks.

In some embodiments, the classifier may determine that the unstructured data comprises the new category by determining that output of the classifier exceeds one or more thresholds of expected outputs associated with a plurality of neural networks. Additionally or alternatively, the classifier may identify the type by searching the unstructured data for one or more known keys associated with a plurality of categories and determine that the unstructured data comprises the new category by determining that the unstructured data does not include any of the one of more known keys.

In response to the determination, the processor may identify an existing category of unstructured data similar to the new category and, based on the identified existing category, select a corresponding neural network. A "similar" category may refer to a category with one or more representative feature vectors that are within one or more threshold distances of one or more feature vectors extracted by the classifier. Additionally or alternatively, a "similar" category may refer to a category with one or more representative distributions (or distribution ranges) or other representative statistical measures (or statistical measure ranges) that are within one or more thresholds of one or more distributions or other statistical measures extracted by the classifier.

In embodiments where the processor determines that a format of the unstructured data differs from a set of known formats, the processor may select a corresponding neural network associated with one of the known formats similar to the format of the unstructured data. Format similarity may be determined like category similarity, described above.

In embodiments where the processor classifies the unstructured data as data generated by a new application, the processor may select a corresponding neural network trained to parse log files from an application generating logs similar to the received log. The similarity may be determined like category similarity, described above.

In any of the embodiments described above, selecting a corresponding neural network may comprise comparing output of the classifier to expected outputs associated with a plurality of neural networks. A neural network is determined to be the corresponding neural network when its associated expected output is closest to the output of the classifier. The "closeness" of the expected output to the output of the classifier may be determined using distances between feature vectors and/or using differences between one or more statistical measures, as described above, of the expected outputs compared with the output of the classifier. Similarly, selecting a corresponding neural network may comprise comparing the distribution from the classifier to expected distributions associated with a plurality of neural networks and determining the corresponding neural network as the neural network having an associated expected distribution closest to the distribution from the classifier.

Additionally or alternatively, selecting a corresponding neural network may comprise applying a plurality of neural networks to the unstructured data to generate a plurality of outputs, scoring the plurality of outputs, and determining the corresponding neural network as the neural network having an associated output with a highest score. In such embodiments, scoring the plurality of outputs may comprise applying a classifier to the plurality of outputs. For example, the scoring classifier may comprise at least one loss function, and the scores may reflect nearness of the outputs to a minimum of the at least one loss function. Additionally or alternatively, the plurality of outputs may comprise structured data, and the classifier may score the plurality of outputs based on a number of null entries in the structured data and/or based on robustness of the structured data. The processor may additionally or alternatively use any other statistical measures of the outputs (such as number of rows; number of columns; number of cells, average or median length of entries overall, within a row, within a column, or the like; average of median size of outputs; or the like).

At step 806, the processor may reset at least one weight and at least one activation function of the corresponding neural network while retaining structure of the corresponding neural network. For example, the at least one weight may be reset to zero or any other default value. Similarly, the at least one activation function may be reset to the Heaviside step function or any other default function.

At step 808, the processor may train the reset neural network to parse the new category of unstructured data. For example, as explained above with respect FIG. 3, the processor may retrieve a plurality of logs of the new type and/or category or having been generated by the new application, e.g., from databases 302, and adjust at least one weight and at least activation function of the reset neural network to minimize a loss function (that is, "train" the reset neural network).

In embodiments where the processor determines that a format of the unstructured data differs from a set of known formats, the processor may train the reset neural network to parse the format of the unstructured data. In embodiments where the processor classifies the unstructured data as data generated by a new application, the processor may train the reset neural network to parse logs from the new application.

Parsing the category or the format of the unstructured data or logs from the new application may comprise transforming the unstructured data into structured data. As explained above, the structured data may comprise at least one of relational data, graphical data, or object-oriented data.

In any of the embodiments above, the processor may generate synthetic unstructured data, e.g., as described above with respect to FIGS. 6A and 6B (but using characters rather than pixels) to assist with training the reset neural network. In such embodiments, the processor may generate the synthetic data only when a number of logs stored in databases 302 that are of the new type and/or category or were generated by the new application is below a threshold. Additionally or alternatively, the processor may generate the synthetic data only when the trained reset neural network has a loss function that is not minimized or not within a threshold of a minimum after the reset neural network is trained using logs stored in databases 302 that are of the new type and/or category or were generated by the new application.

At step 810, the processor may output the trained neural network. For example, outputting the trained neural network may comprise at least one of storing a data file defining the trained neural network or transmitting the data file to an external device.

Method 800 may further include additional steps. For example, method 800 may further include pre-processing the unstructured data (which may comprise a log file) to standardize delimiters within the unstructured data. Additional or alternative pre-processing may be used, as described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for parsing unstructured data comprising:
   at least one processor; and
   at least one non-transitory memory storing instructions that, when executed by the at least one processor, cause the system to perform operations comprising:
   receiving unstructured data comprising actual data from an application;
   applying a classifier to the unstructured data to identify a type of the unstructured data;
   selecting a first neural network when the type of the unstructured data is known;
   selecting a second neural network when the type of the unstructured data is unknown, wherein selecting the second neural network includes training the second neural network using generated synthetic data that is similar to the actual data;
   applying the selected first or second neural network to the unstructured data to obtain structured data; and
   outputting the structured data.

2. The system of claim 1, wherein the structured data comprises at least one of relational data, graphical data, or object-oriented data.

3. The system of claim 1, wherein the unstructured data comprises a log file.

4. The system of claim 3, wherein the log file is generated by at least one application.

5. The system of claim 1, wherein the classifier comprises at least one of a linear classifier, a bag-of-words model, or a character-level convolutional neural network.

6. The system of claim 1, wherein the classifier identifies the type of the unstructured data by searching the unstructured data for one or more known keys associated with the type.

7. The system of claim 6, wherein the one or more known keys comprise at least one alphanumeric string associated with the type.

8. The system of claim 1, wherein the first neural network is indexed by the type of the unstructured data and retrieved using the index.

9. The system of claim 1, wherein the selected first or second neural network comprises at least one of a recurrent neural network or a convolutional neural network.

10. The system of claim 1, wherein the selected first or second neural network comprises a neural network trained using a character window.

11. The system of claim 10, wherein:
    selecting the first neural network comprises selecting the first neural network from among a plurality of neural networks; and
    each neural network in the plurality of neural networks has an associated character window.

12. A system for parsing unstructured data comprising:
    at least one processor; and
    at least one non-transitory memory storing instructions that, when executed by the at least one processor, cause the system to perform operations comprising:
    receiving a log file comprising unstructured data, wherein the unstructured data comprises actual data generated by an application;
    applying a classifier to the unstructured data to identify at least one distribution, wherein the at least one distribution is a distribution of one or more letters, a distribution of one or more integers, a distribution of one or more special characters, or a distribution of one or more alphanumeric characters;
    selecting a first neural network when the type of the unstructured data is known;
    selecting a second neural network when the type of the unstructured data is unknown, wherein selecting the second neural network includes training the second neural network using generated synthetic data that is similar to the actual data;

applying the selected first or second neural network to the log file to obtain structured data corresponding to the unstructured data; and outputting the structured data.

13. The system of claim 12, wherein the structured data comprises at least one of relational data, graphical data, or object-oriented data.

14. The system of claim 12, wherein outputting the structured data comprises at least one of storing the structured data or transmitting the structured data to an external device.

15. The system of claim 12, wherein selecting the first neural network comprises determining that the at least one distribution identified by the classifier falls within a distribution range associated with the first neural network.

16. The system of claim 12, wherein selecting the first neural network comprises determining that a distribution associated with the first neural network falls within a threshold of the at least one distribution identified by the classifier.

17. The system of claim 12, wherein:

applying a classifier to the unstructured data to identify at least one distribution comprises applying the classifier to identify a plurality of distributions; and selecting the first neural network comprises determining that the plurality of distributions identified by the classifier fall within distribution ranges associated with the first neural network.

18. The system of claim 12, wherein:

applying a classifier to the unstructured data to identify at least one distribution comprises applying the classifier to identify a plurality of distributions; and selecting the first neural network comprises determining that distributions associated with the first neural network fall within thresholds of the plurality of distributions identified by the classifier.

19. The system of claim 12, wherein selecting the first or second neural network comprises:

applying a plurality of neural networks to the log file to produce a plurality of outputs;

assigning a score to at least one output in the plurality of outputs based on the proximity of the at least one output to a minimum of at least one loss function; and identifying the first or second neural network based on the assigned score.

20. A system for parsing unstructured data comprising:

at least one processor; and at least one non-transitory memory storing instructions that, when executed by the at least one processor, cause the system to perform operations comprising:

receiving a log file comprising unstructured data, wherein the unstructured data comprises actual data generated by an application;

pre-processing the log file to standardize delimiters within the unstructured data;

applying a classifier to the unstructured data to identify the application;

selecting a first neural network trained to parse log files from the identified application when the type of the unstructured data is known;

selecting a second neural network when the type of the unstructured data is unknown, wherein selecting the second neural network includes training the second neural network using generated synthetic data that is similar to the actual data;

applying the selected first or second neural network to the log file to obtain tabular data corresponding to the unstructured data; and outputting the tabular data to a relational database.

\* \* \* \* \*